(12) United States Patent
Weaver et al.

(10) Patent No.: US 10,348,353 B2
(45) Date of Patent: Jul. 9, 2019

(54) ELECTRONIC DEVICE PROTECTION SYSTEM

(71) Applicants: Steve Weaver, Long Beach, CA (US); Sohrab Sedghi, Los Angeles, CA (US)

(72) Inventors: Steve Weaver, Long Beach, CA (US); Sohrab Sedghi, Los Angeles, CA (US)

( * ) Notice: Subject to any disclaimer, the term of this patent is extended or adjusted under 35 U.S.C. 154(b) by 0 days.

(21) Appl. No.: 15/890,121

(22) Filed: Feb. 6, 2018

(65) Prior Publication Data
US 2018/0183481 A1 Jun. 28, 2018

Related U.S. Application Data

(63) Continuation of application No. 29/568,849, filed on Jun. 22, 2016, now Pat. No. Des. 842,287, and a continuation of application No. 29/568,844, filed on Jun. 22, 2016, now Pat. No. Des. 842,286.

(51) Int. Cl.
*H04M 1/02* (2006.01)
*H04B 1/3888* (2015.01)

(52) U.S. Cl.
CPC ........ *H04B 1/3888* (2013.01); *H04M 1/0202* (2013.01)

(58) Field of Classification Search
CPC ............................ H04B 1/3888; H04M 1/0202
See application file for complete search history.

(56) References Cited

U.S. PATENT DOCUMENTS

| | | | |
|---|---|---|---|
| 6,646,864 B2 | 11/2003 | Richardson | |
| 8,245,842 B2 | 8/2012 | Bau | |
| D668,246 S | 10/2012 | Fathollahi | |
| 8,380,265 B2 * | 2/2013 | Kim | G06F 1/1626 455/575.1 |
| 8,477,931 B2 * | 7/2013 | Thompson | H04M 1/0283 379/437 |
| 8,505,718 B2 * | 8/2013 | Griffin, Jr. | A45C 11/00 206/320 |
| 8,623,494 B2 * | 1/2014 | Richardson | A45C 11/00 206/521 |
| 8,675,862 B1 * | 3/2014 | Lin | H04M 1/185 379/437 |

(Continued)

FOREIGN PATENT DOCUMENTS

| | | |
|---|---|---|
| CN | 200956690 Y | 10/2007 |
| CN | 102490298 A | 6/2012 |

(Continued)

*Primary Examiner* — Lewis G West
(74) *Attorney, Agent, or Firm* — John D. Tran; Rhema Law Group (57) ABSTRACT

An electronic device protection system can include: a back side surface, a right side surface, a left side surface, a top side surface, a bottom side surface, and a front side surface, the front side surface configured to wrap around onto a front side display of an electronic device, and the back side surface configured to conform to the electronic device; a first surface protrusion having a first outer perimeter, the first surface protrusion located on the back side surface; a second surface protrusion having a second outer perimeter, the second outer perimeter larger than the first outer perimeter; and a connection cutout formed within the top side surface or the right side surface.

18 Claims, 9 Drawing Sheets

(56) References Cited

U.S. PATENT DOCUMENTS

| | | | |
|---|---|---|---|
| 8,687,351 B2 * | 4/2014 | Yturralde | G06F 1/1628 361/679.02 |
| D718,756 S * | 12/2014 | Barfoot | D14/250 |
| 8,933,347 B2 * | 1/2015 | Kiple | B23P 11/00 174/541 |
| 8,982,553 B2 | 3/2015 | Yi | |
| D731,473 S | 6/2015 | Akana et al. | |
| 9,155,367 B2 | 10/2015 | Fathollahi et al. | |
| D744,994 S | 12/2015 | Akana et al. | |
| 9,465,520 B2 * | 10/2016 | Mestre | G06F 3/0484 |
| 9,660,684 B2 * | 5/2017 | Rayner | H04B 1/3888 |
| 9,846,452 B2 * | 12/2017 | Pakula | H05K 5/03 |
| 2008/0053852 A1 | 3/2008 | Ko | |
| 2011/0186345 A1 * | 8/2011 | Pakula | G06F 1/1626 174/520 |
| 2012/0261289 A1 * | 10/2012 | Wyner | A45C 11/00 206/320 |
| 2012/0314354 A1 * | 12/2012 | Rayner | H01H 13/06 361/679.01 |
| 2013/0063874 A1 | 3/2013 | Yi et al. | |
| 2013/0122201 A1 | 5/2013 | Valdez | |
| 2014/0128132 A1 | 5/2014 | Cox | |
| 2014/0144792 A1 | 5/2014 | Wyner et al. | |
| 2014/0233169 A1 * | 8/2014 | Hobson | H01Q 1/243 361/679.3 |
| 2014/0246339 A1 | 9/2014 | Chung et al. | |
| 2014/0262847 A1 * | 9/2014 | Yang | A45C 11/00 206/37 |
| 2015/0065206 A1 * | 3/2015 | Rojas | G06F 1/16 455/575.1 |
| 2015/0111623 A1 * | 4/2015 | Hegemier | H04M 1/0283 455/575.1 |
| 2016/0066460 A1 * | 3/2016 | Rayner | A45C 13/008 224/191 |
| 2016/0234362 A1 * | 8/2016 | Moon | H04M 1/0202 |
| 2017/0201286 A1 * | 7/2017 | Qian | H04B 1/3888 |
| 2017/0237460 A1 * | 8/2017 | Rayner | H04B 1/3888 455/575.8 |

FOREIGN PATENT DOCUMENTS

| | | |
|---|---|---|
| CN | 20231178 U | 7/2012 |
| CN | 103858528 | 6/2014 |
| CN | 103974573 | 6/2014 |
| CN | 104221352 | 12/2014 |
| CN | 204305117 U | 4/2015 |

* cited by examiner

ELECTRONIC DEVICE PROTECTION SYSTEM

CROSS-REFERENCE TO RELATED APPLICATIONS

This is a Continuation-in-Part of U.S. design patent application Ser. No. 29/568,844 filed Jun. 22, 2016 entitled ORNAMENTAL PHONE CASE DESIGN. This is further a Continuation-in-Part of U.S. design patent application Ser. No. 29/568,849 filed Jun. 22, 2016 entitled ORNAMENTAL PHONE CASE DESIGN. The content of these applications is incorporated herein by reference.

TECHNICAL FIELD

This disclosure relates to cellphone cases, more particularly to protective textured cellphone cases.

BACKGROUND

The rapidly growing portable electronics market, e.g. cellular phones, laptop computers, tablets, networked watches, and PDAs, are an integral facet of modern life. The multitude of portable devices represents one of the largest potential market opportunities for next generation protection systems. These consumer electronic devices have unique attributes that have significant impacts on accessories, like protection systems, in that the accessories must be generally small, lightweight, and rich in functionality and they must be produced in high volumes at relatively low cost.

As an extension of the consumer electronic device, the electronics accessory industry has witnessed ever-increasing commercial competitive pressures, along with growing consumer expectations and the diminishing opportunities for meaningful product differentiation in the marketplace.

Current accessory suppliers are struggling to accommodate the increasing environmental fragility and ergonomic expectations in the near future. The current technologies, materials, equipment, and structures offer challenges to the basic assembly of these new accessories while still not adequately addressing ergonomic, protection, and cost concerns.

As the size of electronic devices continues to decrease, electronic devices become increasingly fragile being sensitive to heat, shock, pressure, moisture, and other environmental conditions, which commonly leads to failure of the device. There exists a definite need for a protection system capable of providing both protection to an electronic device from environmental conditions and ergonomic ease of use.

In view of the ever-increasing commercial competitive pressures, along with growing consumer expectations and the diminishing opportunities for meaningful product differentiation in the marketplace, it is critical that answers be found for these problems. Additionally, the need to reduce costs, reduce production time, improve efficiencies and performance, and meet competitive pressures, adds an even greater urgency to the critical necessity for finding answers to these problems.

Thus, a need remains for protection systems capable of providing high degrees of protection and ergonomics at a lower price point. Solutions to these problems have been long sought but prior developments have not taught or suggested any solutions and, thus, solutions to these problems have long eluded those skilled in the art.

SUMMARY

An electronic device protection system and methods, providing significantly higher degrees of protection and ergonomics at a lower price point, are disclosed. The protection system and methods can include: a back side surface, a right side surface, a left side surface, a top side surface, a bottom side surface, and a front side surface, the front side surface configured to wrap around onto a front side display of an electronic device, and the back side surface configured to conform to the electronic device; a first surface protrusion having a first outer perimeter, the first surface protrusion located on the back side surface; a second surface protrusion having a second outer perimeter, the second outer perimeter larger than the first outer perimeter; and a connection cutout formed within the top side surface or the right side surface.

Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE DRAWINGS

The protection system is illustrated in the figures of the accompanying drawings which are meant to be exemplary and not limiting, in which like reference numerals are intended to refer to like components, and in which.

DETAILED DESCRIPTION

In the following description, reference is made to the accompanying drawings that form a part hereof, and in which are shown by way of illustration, embodiments in which the protection system may be practiced. It is to be understood that other embodiments may be utilized and structural changes may be made without departing from the scope of the protection system.

When features, aspects, or embodiments of the protection system are described in terms of steps of a process, an operation, a control flow, or a flow chart, it is to be understood that the steps can be combined, performed in a different order, deleted, or include additional steps without departing from the protection system as described herein.

The protection system is described in sufficient detail to enable those skilled in the art to make and use the protection system and provide numerous specific details to give a thorough understanding of the protection system; however, it will be apparent that the protection system may be practiced without these specific details.

In order to avoid obscuring the protection system, some well-known system configurations are not disclosed in detail. Likewise, the drawings showing embodiments of the system are semi-diagrammatic and not to scale and, particularly, some of the dimensions are for the clarity of presentation and are shown greatly exaggerated in the drawing FIGS. Generally, the protection system can be operated in any orientation.

Figure 1:
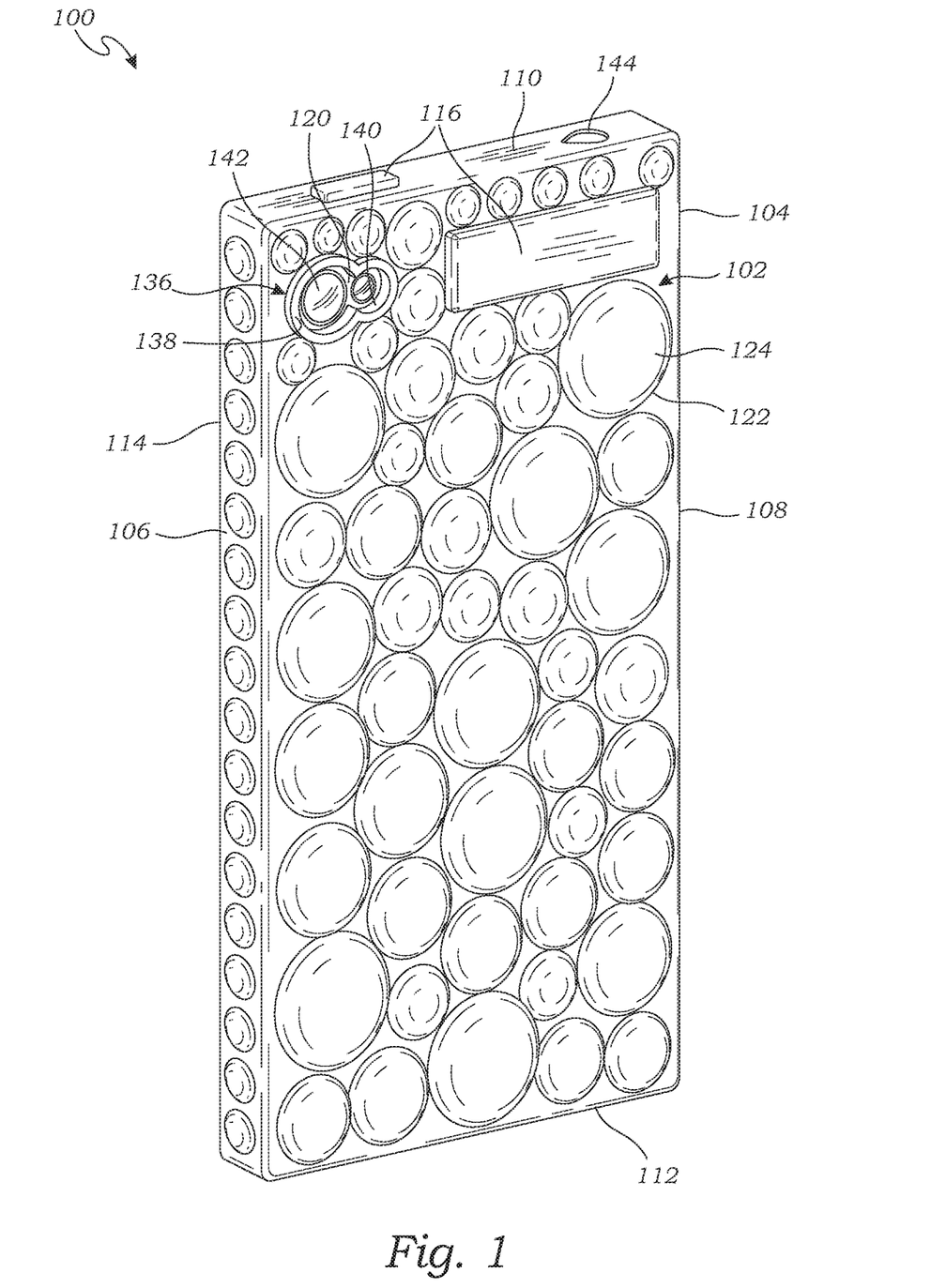
FIG. 1 is an isometric back view of the protection system in a first embodiment.

Referring now to FIG. 1, therein is shown an isometric back view of the protection system 100 in a first embodiment. The protection system 100 is depicted having surface protrusions 102 on a back side surface 104 of the protection system 100.

The protection system 100 is shown having a right side surface 106, a left side surface 108, a top side surface 110, a bottom side surface 112, and a front surface 114. The surface protrusions 102 are shown only on the back side surface 104 and the right side surface 106. The surface protrusions 102 are also on the left side surface 108 as will be seen and described with regard to FIGS. 2-7. The surface protrusions 102 are not on the top side surface 110, the bottom side surface 112, or the front surface 114.

It has been discovered that implementing the surface protrusions 102 only on the back side surface 104, the right side surface 106, and the left side surface 108 and not the other surfaces aids in the ergonomic usability of the protection system 100 and further allows the protection system 100 to be used propped up with the bottom side surface 112 in direct stable contact with a table or a desk. As is depicted, the top side surface 110, the right side surface 106, the left side surface 108, and the bottom side surface 112 are angled and extended away from the back side surface 104, and the back side surface 104: is configured to conform to the electronic device, is configured to mount to the electronic device and face in a direction opposite of a display of the electronic device, has a uniform curvature, is bounded along a perimeter by the right side surface 106, is bounded along the perimeter by the left side surface 108, is bounded along the perimeter by the top side surface 110, and is bounded along the perimeter by the bottom side surface 112. An entire outer perimeter of at least one of the surface protrusions 102 is depicted in direct contact with the back side surface 104.

Function keys 116 are shown extended out from the top side surface 110 and the back side surface 104 and past both the top side surface 110 and the back side surface 104. Thus the top side surface 110 and the back side surface 104 can be thin layers around the function keys 116 or can angle down toward the electronic device 120 and become flush with the electronic device 120 near and around the function keys 116.

The surface protrusions 102 are shown to have a circular outer perimeter 122 and a semi circular or domed center dome 124. The outer perimeter 122 is shown having as having a circular edge. The center dome 124 is not shown having a surface texture but instead can be smooth.

The surface protrusions 102 can be many different sizes in width, meaning the outer perimeter 122 can be many different lengths and the distance the center dome 124 extends out from the back side surface 104 is different depending on the size of the outer perimeter 122. The differing height of the surface protrusions 102 stems from the surface protrusions 102 all having a similar shape or slope of transition from the back side surface 104 near the outer perimeter 122 to the far portion of the center dome 124.

The surface protrusions 102 on the right side surface 106 are all depicted as smaller surface protrusions 102 while the back side surface 104 has a mixture of small, medium, large, and extra large surface protrusions 102. Near the top side surface 110 and extended from the back side surface 104, the protection system 100 is shown having a sensor extension 136.

The sensor extension 136 can extend out away from the back side surface 104 and terminate with the end surfaces 138 parallel to the back side surface 104. The sensor extension 136 can include inner surfaces 140, which can boarder and directly contact the electronic device 120 allowing sensors 142 to be exposed from the protection system 100.

The sensors 142 exposed from within the sensor extension 136 can include image sensors, sound sensors, and even other components such as flash lighting. It has been discovered that the inner surfaces 140 of the sensor extension 136 extended out away from the back side surface 104 can provide environmental protection for the sensors 142 like shading from sun and even impact protection.

The top side surface 110 is depicted having a connection cutout 144. The connection cutout 144 can provide an opening for connecting the electronic device 120 to peripheral devices, accessories, or chargers.

Figure 2:
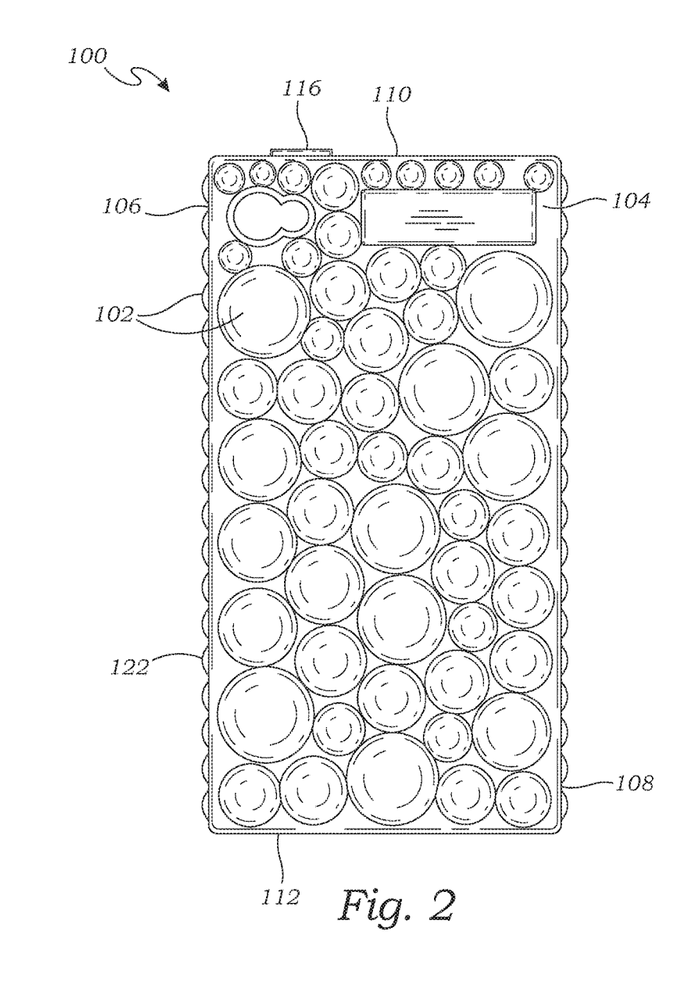
FIG. 2 is a back side view of the protection system of FIG. 1.

Referring now to FIG. 2, therein is shown a back side view of the protection system 100 of FIG. 1. The protection system 100 is shown having the surface protrusions 102 extended out from the back side surface 104, the right side surface 106, and the left side surface 108.

The protection system 100 is shown not having the surface protrusions 102 extended from the top side surface 110 or the bottom side surface 112. The function keys 116 are shown extended out from the top side surface 110 and past the top side surface 110. The surface protrusions 102 extended the same distance from the right side surface 106 and the left side surface 108 since the surface protrusions 102 have the same outer perimeter 122 length.

Figure 3:
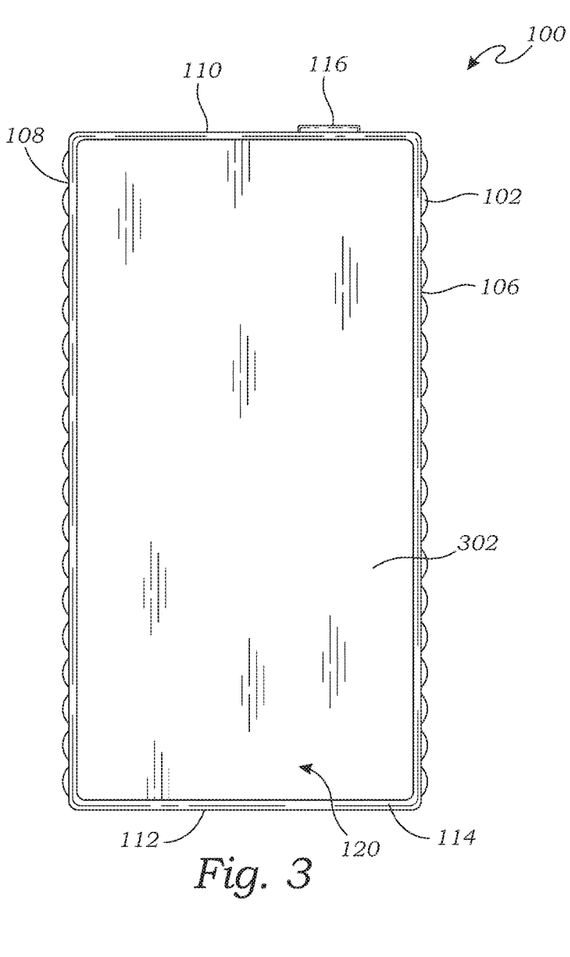
FIG. 3 is a front side view of the protection system of FIG. 1.

Referring now to FIG. 3, therein is shown a front side view of the protection system 100 of FIG. 1. The protection system 100 is shown having the surface protrusions 102 extended out from the right side surface 106, and the left side surface 108.

The protection system 100 is shown not having the surface protrusions 102 extended from the top side surface 110 or the bottom side surface 112. The function keys 116 are shown extended out from the top side surface 110 and past the top side surface 110.

The front side surface 114 is shown extended onto a front side display 302 of the electronic device 120. It is shown that only the edges of the electronic device 120 are covered by the front side surface 114.

Figure 4:
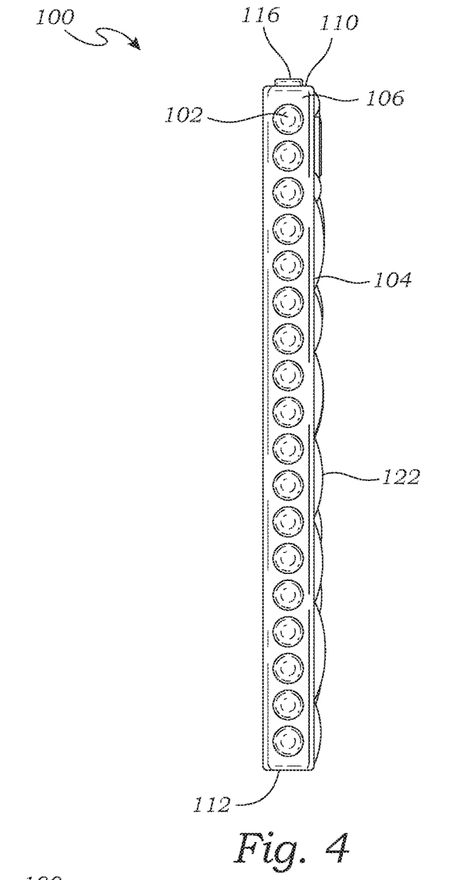
FIG. 4 is a right side view of the protection system of FIG. 1.

Referring now to FIG. 4, therein is shown a right side view of the protection system 100 of FIG. 1. The protection system 100 is shown having the surface protrusions 102 extended out from the right side surface 106 and the back side surface 104.

The protection system 100 is shown not having the surface protrusions 102 extended from the top side surface 110 or the bottom side surface 112. The function keys 116 are shown extended out from the top side surface 110 and past the top side surface 110.

The surface protrusions 102 extended from the back side surface 104 are shown extended different distances from the back side surface 104 due to the outer perimeter 122 being different. For example the surface protrusions 102 with smaller outer perimeters 122 will not extend as far as the surface protrusions 102 with larger outer perimeters 122.

It has been discovered that varying the distance the surface protrusions 102 extends from the protection system 100 increases the ergonomics and ability to grip the protection system 100 when coupled to the electronic device 120.

Figure 5:
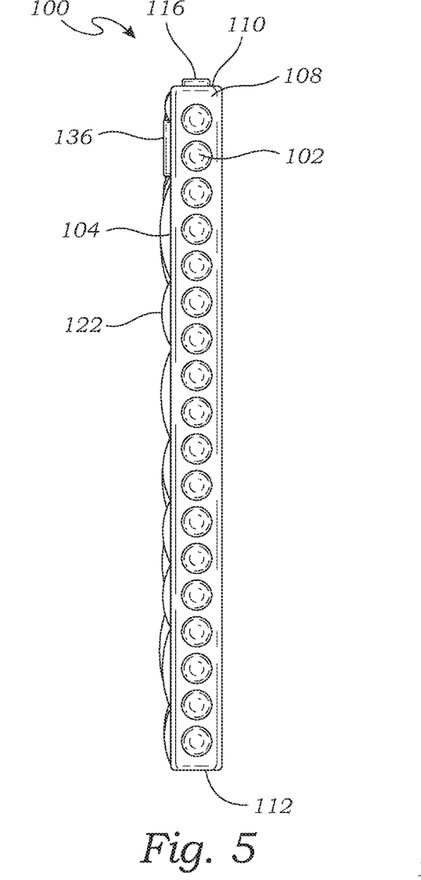
FIG. 5 is a left side view of the protection system of FIG. 1.

Referring now to FIG. 5, therein is shown a left side view of the protection system 100 of FIG. 1. The protection system 100 is shown having the surface protrusions 102 extended out from the left side surface 108 and the back side surface 104.

The protection system 100 is shown not having the surface protrusions 102 extended from the top side surface 110 or the bottom side surface 112. The function keys 116 are shown extended out from the top side surface 110 and past the top side surface 110.

The surface protrusions 102 extended from the back side surface 104 are shown extended different distances from the back side surface 104 due to the outer perimeter 122 being different. For example the surface protrusions 102 with smaller outer perimeters 122 will not extend as far as the surface protrusions 102 with larger outer perimeters 122.

Some of the surface protrusions 102 extended from the back side surface 104 are depicted extended farther away from the back side surface 104 than the sensor extension 136. Other smaller surface protrusions 102 extended from the back side surface 104 are depicted extended closer than the sensor extension 136 from the back side surface 104.

It has been discovered that varying the distance the surface protrusions 102 extends from the protection system 100 increases the ergonomics and ability to grip the protection system 100 when coupled to the electronic device 120 while simultaneously providing additional protection for the sensors 142 of FIG. 1.

Figures 6, 7:
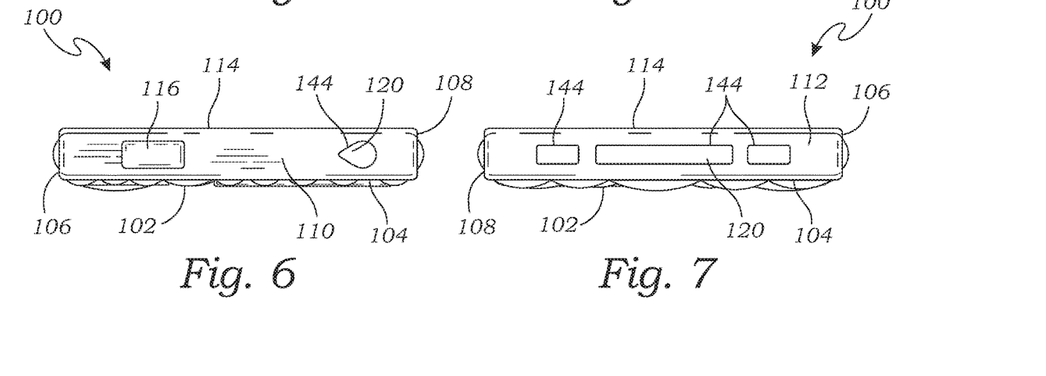
FIG. 6 is a top side view of the protection system of FIG. 1.
FIG. 7 is a bottom side view of the protection system of FIG. 1.

Referring now to FIG. 6, therein is shown a top side view of the protection system 100 of FIG. 1. The protection system 100 is shown having the surface protrusions 102 extended out from the back side surface 104, left side surface 108, and the right side surface 106.

The protection system 100 is shown not having the surface protrusions 102 extended from the top side surface 110 or the front side surface 114. The function keys 116 are shown extended out from the top side surface 110 and past the top side surface 110.

The connection cutout 144 is also shown exposing the electronic device 120 from within the connection cutout 144. The connection cutout 144 is located on the top side surface 110.

Referring now to FIG. 7, therein is shown a bottom side view of the protection system 100 of FIG. 1. The protection system 100 is shown having the surface protrusions 102 extended out from the back side surface 104, left side surface 108, and the right side surface 106.

The protection system 100 is shown not having the surface protrusions 102 extended from the bottom side surface 112 or the front side surface 114. The connection cutouts 144 are also shown exposing the electronic device 120 from within the connection cutouts 144. The connection cutouts 144 is located on the bottom side surface 112.

Figure 8:
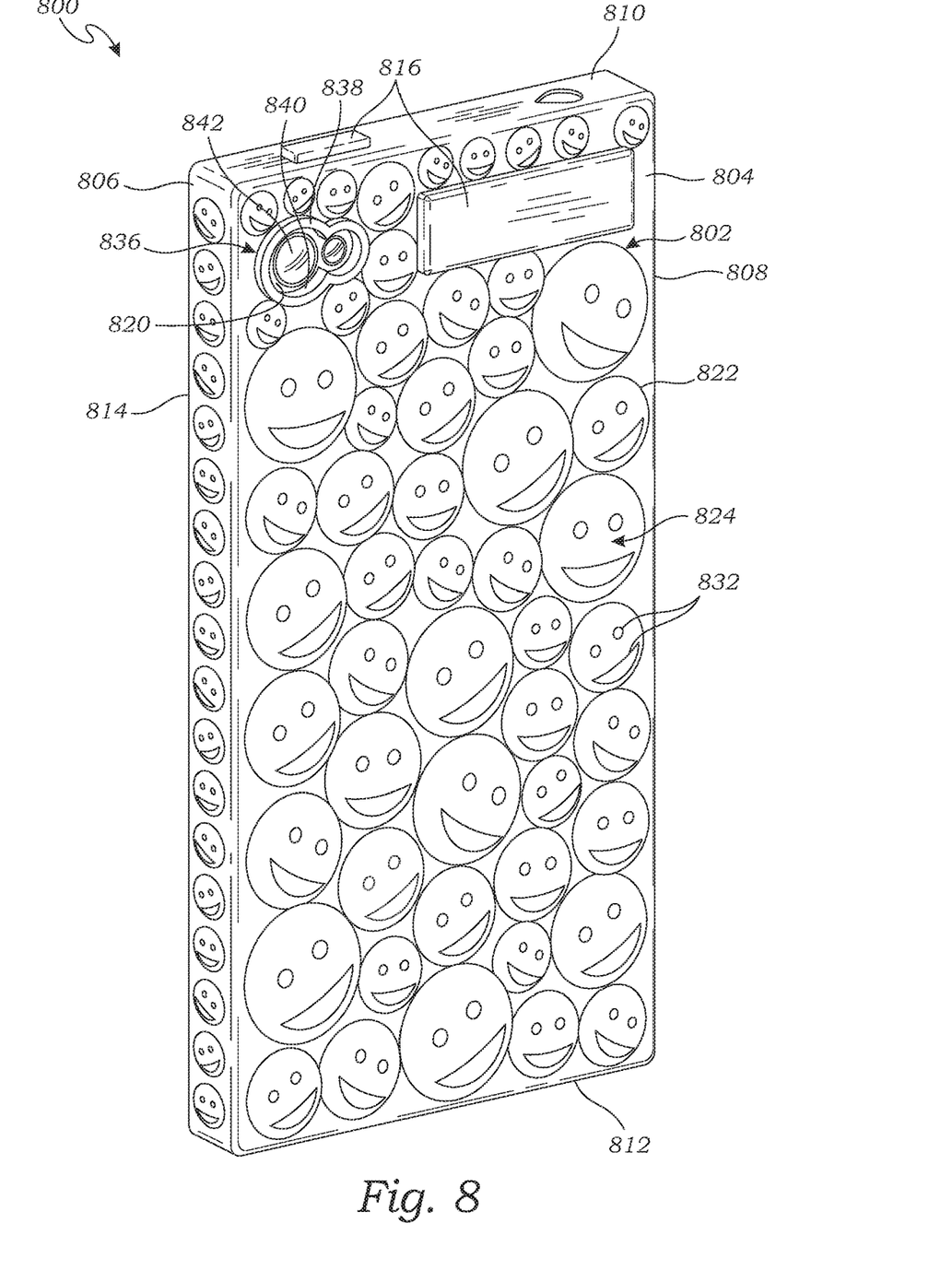
FIG. 8 is an isometric back view of the protection system in a second embodiment.

Referring now to FIG. 8, therein is shown an isometric back view of the protection system 800 in a second embodiment. The protection system 800 is depicted having surface protrusions 802 on a back side surface 804 of the protection system 800.

The protection system 800 is shown having a right side surface 806, a left side surface 808, a top side surface 810, a bottom side surface 812, and a front surface 814. The surface protrusions 802 are shown only on the back side surface 804 and the right side surface 806. The surface protrusions 802 are also on the left side surface 808 was seen and described with regard to FIGS. 2-7. The surface protrusions 802 are not on the top side surface 810, the bottom side surface 812, or the front surface 814.

It has been discovered that implementing the surface protrusions 802 only on the back side surface 804, the right side surface 806, and the left side surface 808 and not the other surfaces aids in the ergonomic usability of the protection system 800 and further allows the protection system 800 to be used propped up with the bottom side surface 812 in direct stable contact with a table or a desk.

Function keys 816 are shown extended out from the top side surface 810 and the back side surface 804 and past both the top side surface 810 and the back side surface 804. Thus the top side surface 810 and the back side surface 804 can be thin layers around the function keys 816 or can angle down toward the electronic device 820 and become flush with the electronic device 820 near and around the function keys 816.

The surface protrusions 802 are shown to have a circular outer perimeter 822 and a semi circular or domed center dome 824. The outer perimeter 822 is shown having as having a circular edge. The center dome 824 is shown having a surface texture 832.

The surface texture 832 is contemplated to include texture extended below the surface of the center dome 824 such as an etched texture. The surface texture 832 is further contemplated to include texture extended above the surface of the center dome 824 such as a raised molded texture. Further, the surface texture 832 can be embedded under a smooth center dome 824 or printed thereon.

As can be seen the surface texture 832 of the inner cavity 824 is depicted as smily faces. It is contemplated that the surface texture 832 can be any combination of letters, numbers, characters, or symbols.

The surface texture 832 within the inner cavity 824 can be in any direction or orientation. The size of the surface texture 832 is dictated by the size and shape of the surface protrusions 802.

The surface protrusions 802 can be many different sizes in width, meaning the outer perimeter 822 can be many different lengths and the distance the center dome 824 extends out from the back side surface 804 is different depending on the size of the outer perimeter 822. The differing height of the surface protrusions 802 stems from the surface protrusions 802 all having a similar shape or slope of transition from the back side surface 804 near the outer perimeter 822 to the far portion of the center dome 824.

The surface protrusions 802 on the right side surface 806 are all depicted as smaller surface protrusions 802 while the back side surface 804 has a mixture of small, medium, large, and extra large surface protrusions 802. Near the top side surface 810 and extended from the back side surface 804, the protection system 800 is shown having a sensor extension 836.

The sensor extension 836 can extend out away from the back side surface 804 and terminate with the end surfaces 838 parallel to the back side surface 804. The sensor extension 836 can include inner surfaces 840, which can boarder and directly contact the electronic device 820 allowing sensors 842 to be exposed from the protection system 800. The sensor extension 836 can extend perpendicularly away from the electronic device 820.

The sensors 842 exposed from within the sensor extension 836 can include image sensors, sound sensors, and even other components such as flash lighting. It has been discovered that the inner surfaces 840 of the sensor extension 836 extended out away from the back side surface 804 can provide environmental protection for the sensors 842 like shading from sun and even impact protection.

The top side surface 810 is depicted having a connection cutout 844. The connection cutout 844 can provide an opening for connecting the electronic device 820 to peripheral devices, accessories, or chargers.

Figure 9:
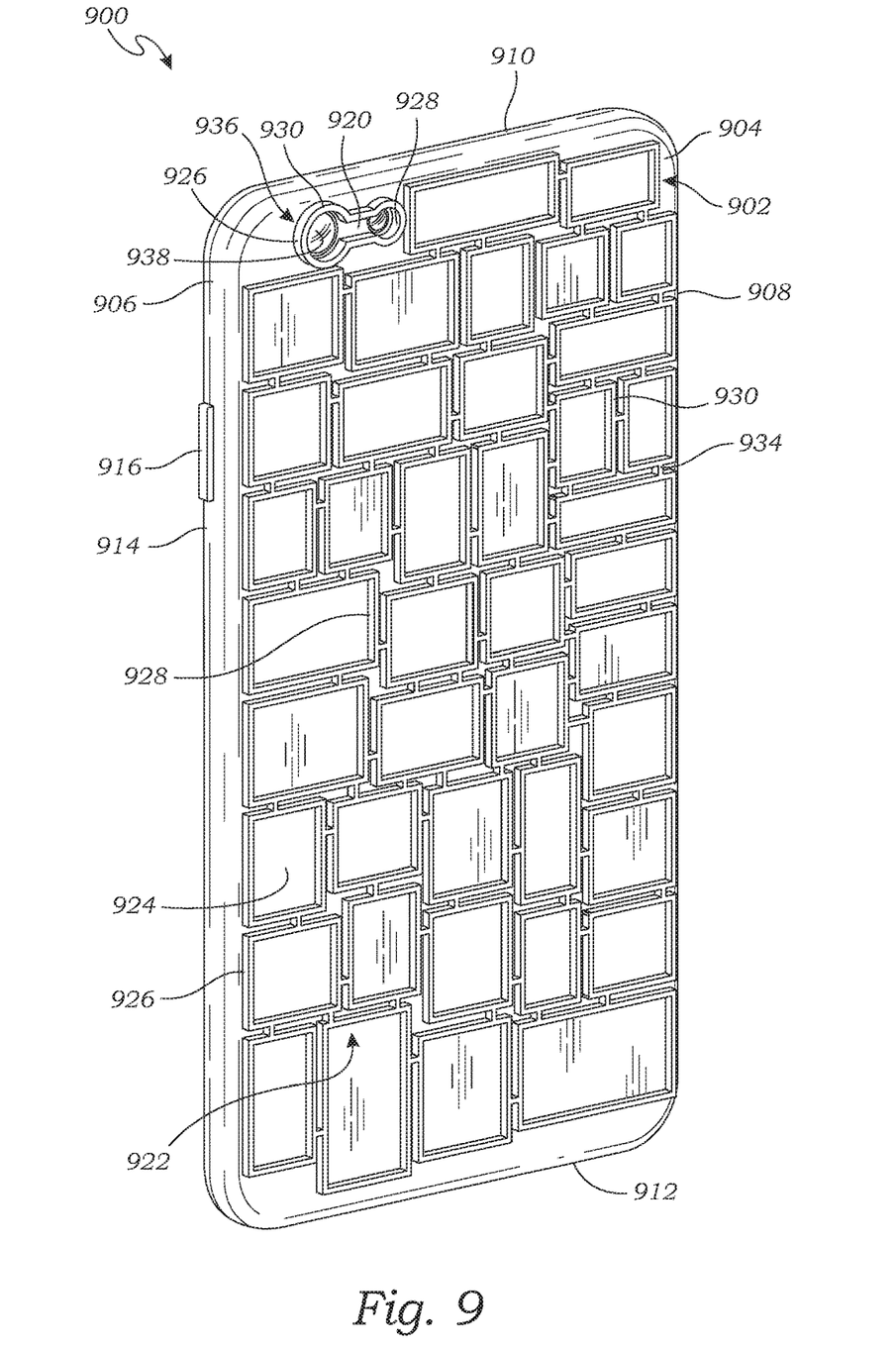
FIG. 9 is an isometric back view of the protection system in a third embodiment.

Referring now to FIG. 9, therein is shown an isometric back view of the protection system 900 in a third embodiment. The protection system 900 is depicted having surface protrusions 902 on a back side surface 904 of the protection system 900.

The protection system 900 is shown having a right side surface 906, a left side surface 908, a top side surface 910, a bottom side surface 912, and a front surface 914. The surface protrusions 902 are shown only on the back side surface 904 and not on the right side surface 906, the left side surface 908, the top side surface 910, the bottom side surface 912, or the front surface 914.

It has been discovered that implementing the surface protrusions 902 only on the back side surface 904 and not the other surfaces aids in the usability of the protection system 900 with some devices, particularly those devices having shallow or difficult to reach function keys 916. These keys can include low profile volume rockers, or low profile power buttons.

The function keys 916 is shown extended out from the right side surface 906 and past the right side surface 906. Thus the right side surface 906 can be a thin layer around the function keys 916 or can angle down toward the electronic device 920 and become flush with the electronic device 920 near and around the function keys 916.

The surface protrusions 902 are shown to be rectangular with a raised perimeter 922 and an inner cavity 924. The raised perimeter 922 is shown having as having flat straight surfaces. That is, the raised perimeter 922 can include outer surfaces 926, inner surfaces 928, and end surfaces 930.

The inner surfaces 928 can face the inner cavity 924 and directly contact and boarder the inner cavity 924. The outer surfaces 926 can be parallel to the inner surfaces 928.

As is depicted, the outer surfaces 926 of the raised perimeter 922 can be extended and parallel to either along the axis running between the top side surface 910 to the bottom side surface 912 and along the axis running between the right side surface 906 and the left side surface 908. The end surfaces 930 can be positioned perpendicular to the outer surfaces 926 and the inner surfaces 928 and can be parallel to the inner cavity 924.

The inner cavity 924 and the end surfaces 930 can be offset by the width of the inner surfaces 928 while the end surfaces 930 can extend beyond the back side surface 904 by the width of the outer surfaces 926. The end surfaces 930, the back side surface 904, and the inner cavity 924 are depicted as parallel.

The inner cavity 924 is shown having no surface texture but is instead smooth. The outer surfaces 926 of each of the surface protrusions 902 is shown connected to adjacent surface protrusions 902 with an inner connect 934. The inner connect 934 can include the outer surfaces 926 and the end surfaces 930 similar to the surface protrusions 902. The end surfaces 930 of the surface protrusions 902 and the inner connect 934 can be coplanar and parallel.

As is shown when larger surface protrusions 902 span two or more smaller surface protrusions 902, the larger surface protrusions 902 can be connected to both of the smaller surface protrusions 902 on a single side with multiple inner connect 934.

Alternatively, it is shown, that one outer surfaces 926 from one surface protrusions 902 can be connected to one outer surfaces 926 of another surface protrusions 902 with a single or with multiple inner connect 934.

The inner connect 934 can be extended and connect perpendicularly between outer surfaces 926 of the surface protrusions 902. Near the top side surface 910 and extended from the back side surface 904, the protection system 900 is shown having a sensor extension 936.

The sensor extension 936 can extend out away from the back side surface 904 and terminate with the end surfaces 930 coplanar and parallel to the end surfaces 930 of the surface protrusions 902. The inner surfaces 928 of the sensor extension 936 can boarder and directly contact the electronic device 920 allowing sensors 938 to be exposed from the protection system 900.

The sensors 938 exposed from within the sensor extension 936 can include image sensors, sound sensors, and even other components such as flash lighting. It has been discovered that the inner surfaces 928 of the sensor extension 936 extended out away from the back side surface 904 can provide environmental protection for the sensors 938 like shading from sun and even impact protection.

Figure 10:
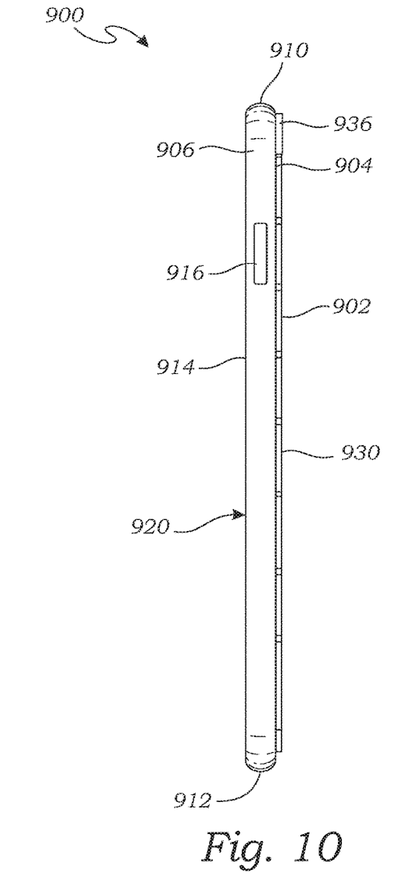
FIG. 10 is a right side view of the protection system of FIG. 9.

Referring now to FIG. 10, therein is shown a right side view of the protection system 900 of FIG. 9. The protection system 900 is shown having the surface protrusions 902 extended out from the back side surface 904.

The protection system 900 is shown not having the surface protrusions 902 extended from the right side surface 906, the top side surface 910, the bottom side surface 912, or the front side surface 914. The function keys 916 are shown extended out from the right side surface 906.

The surface protrusions 902 extended from the back side surface 904 are shown extended similar distances from the back side surface 904 and terminate in the coplanar end surfaces 930.

It has been discovered that similar the distance the surface protrusions 902 extends from the protection system 900 increases the functionality and storability of the protection system 900 when coupled to the electronic device 920.

The surface protrusions 902 extended from the back side surface 904 are depicted extended the same distance from the back side surface 904 as the sensor extension 936. It has been discovered that the surface protrusions 902 extending from the protection system 900 the same distance as the sensor extension 936 provides additional protection for the sensors sensors 938 of FIG. 9.

Figure 11:
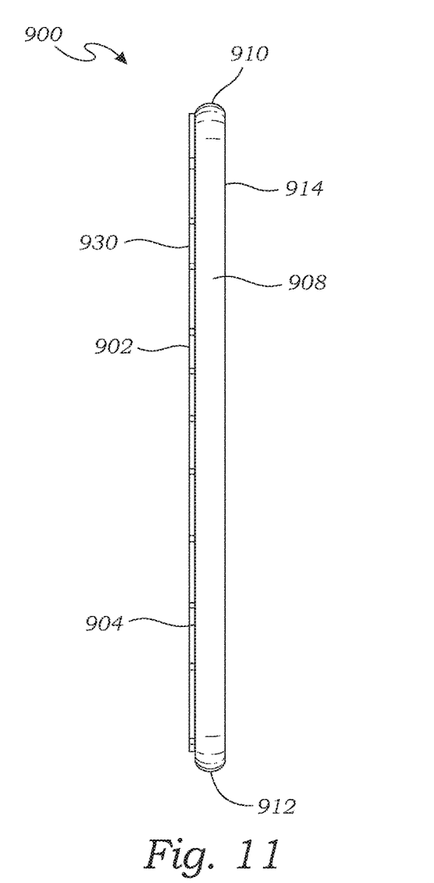
FIG. 11 is a left side view of the protection system of FIG. 9.

Referring now to FIG. 11, therein is shown a left side view of the protection system 900 of FIG. 9. The protection system 900 is shown having the surface protrusions 902 extended out from the back side surface 904.

The protection system 900 is shown not having the surface protrusions 902 extended from the left side surface 908, the top side surface 910, the bottom side surface 912, or the front side surface 914. The surface protrusions 902 extended from the back side surface 904 are shown extended similar distances from the back side surface 904 and terminate in the coplanar end surfaces 930.

It has been discovered that similar the distance the surface protrusions 902 extends from the protection system 900 increases the functionality and storability of the protection system 900 when coupled to the electronic device 920.

Figures 12, 13:
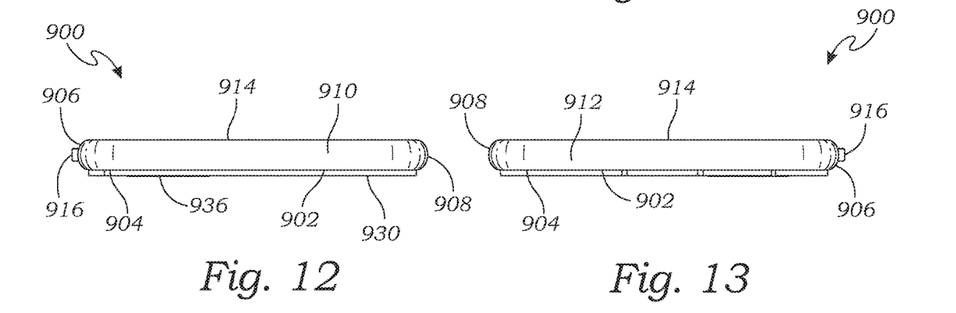
FIG. 12 is a top side view of the protection system of FIG. 9.
FIG. 13 is a bottom side view of the protection system of FIG. 9.

Referring now to FIG. 12, therein is shown a top side view of the protection system 900 of FIG. 9. The protection system 900 is shown having the surface protrusions 902 extended out from the back side surface 904.

The protection system 900 is shown not having the surface protrusions 902 extended from the right side surface 906, the left side surface 908, the top side surface 910, or the front side surface 914. The function keys 916 are shown extended out from the right side surface 906.

The surface protrusions 902 extended from the back side surface 904 are shown extended similar distances from the back side surface 904 and terminate in the coplanar end surfaces 930.

It has been discovered that similar the distance the surface protrusions 902 extends from the protection system 900 increases the functionality and storability of the protection system 900 when coupled to the electronic device 920.

The surface protrusions 902 extended from the back side surface 904 are depicted extended the same distance from the back side surface 904 as the sensor extension 936. It has been discovered that the surface protrusions 902 extending from the protection system 900 the same distance as the sensor extension 936 provides additional protection for the sensors sensors 938 of FIG. 9.

Referring now to FIG. 13, therein is shown a bottom side view of the protection system 900 of FIG. 9. The protection system 900 is shown having the surface protrusions 902 extended out from the back side surface 904.

The protection system 900 is shown not having the surface protrusions 902 extended from the right side surface 906, the left side surface 908, the top side surface 910, or the front side surface 914. The function keys 916 are shown extended out from the right side surface 906.

The surface protrusions 902 extended from the back side surface 904 are shown extended similar distances from the back side surface 904 and terminate in the coplanar end surfaces 930.

It has been discovered that similar the distance the surface protrusions 902 extends from the protection system 900 increases the functionality and storability of the protection system 900 when coupled to the electronic device 920.

Figure 14:
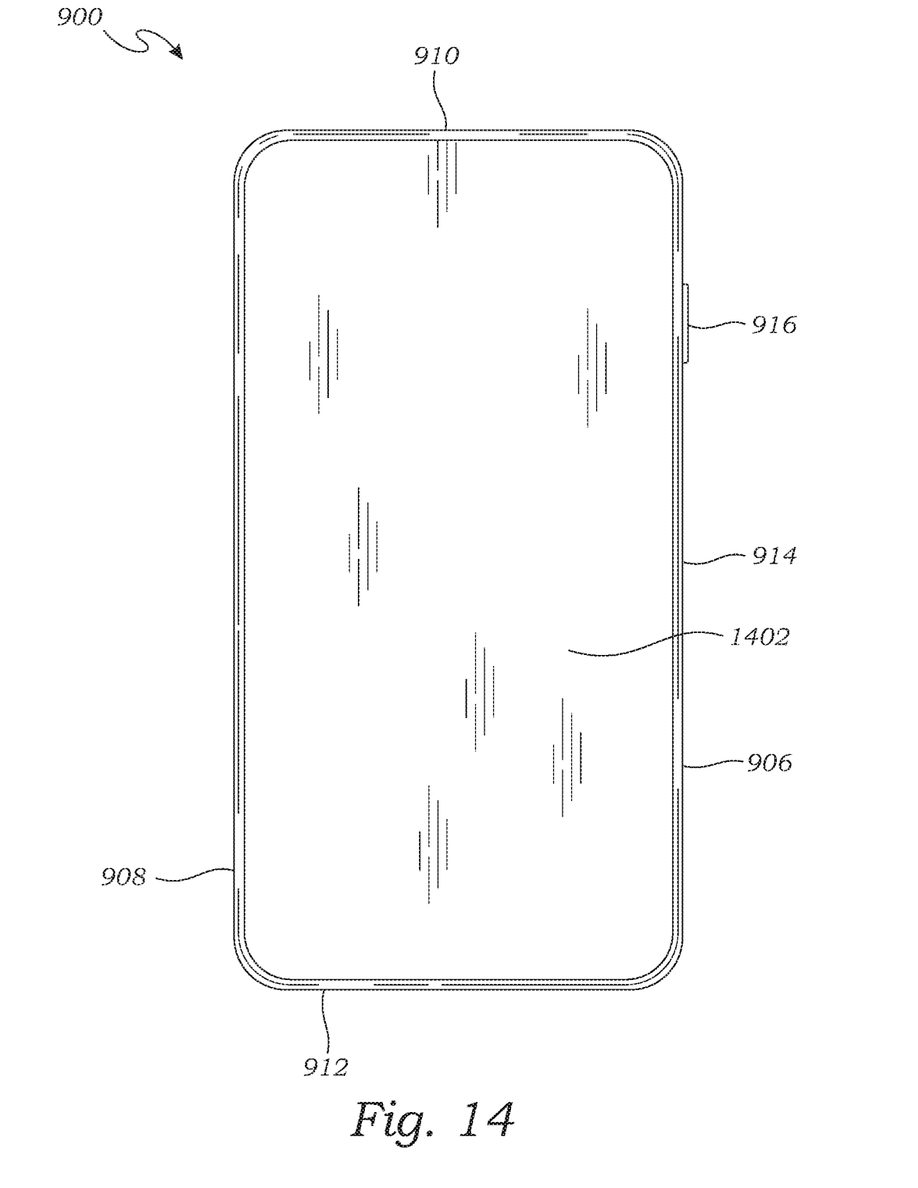
FIG. 14 is a front side view of the protection system of FIG. 9.

Referring now to FIG. 14, therein is shown a front side view of the protection system 900 of FIG. 9. The protection system 900 is shown not having the surface protrusions 902 of FIG. 9 extended from the top side surface 910, the bottom side surface 912, the front side surface 914, the right side surface 906, or the left side surface 908. The function keys 916 are shown extended out from the right side surface 906 and past the right side surface 906.

The front side surface 914 is shown extended onto a front side display 1402 of the electronic device 920. It is shown that only the edges of the electronic device 920 are covered by the front side surface 914.

Figure 15:
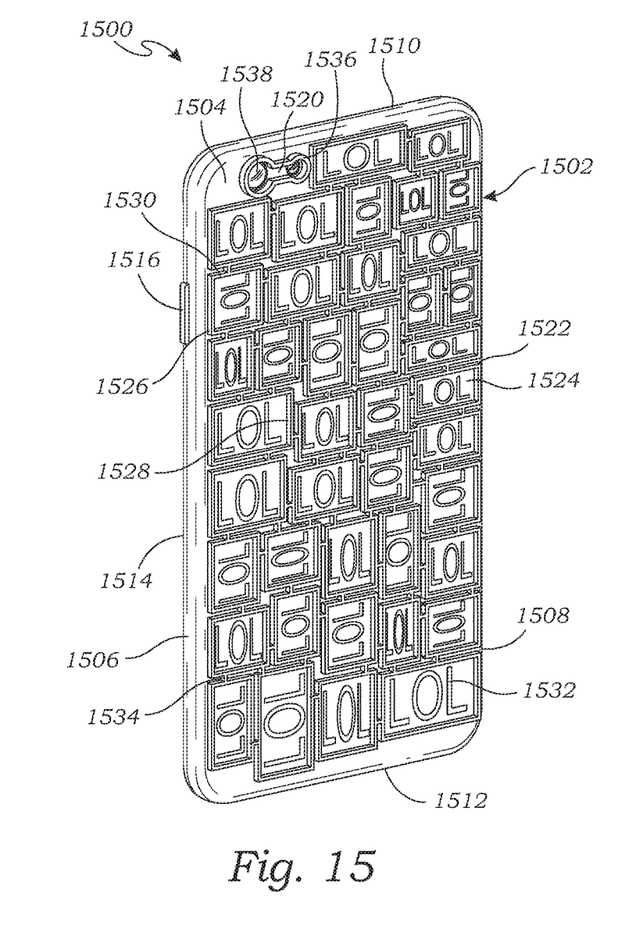
FIG. 15 is an isometric back view of the protection system in a fourth embodiment.

Referring now to FIG. 15, therein is shown an isometric back view of the protection system 1500 in a fourth embodiment. The protection system 1500 is depicted having surface protrusions 1502 on a back side surface 1504 of the protection system 1500.

The protection system 1500 is shown having a right side surface 1506, a left side surface 1508, a top side surface 1510, a bottom side surface 1512, and a front surface 1514. The surface protrusions 1502 are shown only on the back side surface 1504 and not on the right side surface 1506, the left side surface 1508, the top side surface 1510, the bottom side surface 1512, or the front surface 1514.

It has been discovered that implementing the surface protrusions 1502 only on the back side surface 1504 and not the other surfaces aids in the usability of the protection system 1500 with some devices, particularly those devices having shallow or difficult to reach function keys 1516. These keys can include low profile volume rockers, or low profile power buttons.

The function keys 1516 is shown extended out from the right side surface 1506 and past the right side surface 1506. Thus the right side surface 1506 can be a thin layer around the function keys 1516 or can angle down toward the electronic device 1520 and become flush with the electronic device 1520 near and around the function keys 1516.

The surface protrusions 1502 are shown to be rectangular with a raised perimeter 1522 and an inner cavity 1524. The raised perimeter 1522 is shown having as having flat straight surfaces. That is, the raised perimeter 1522 can include outer surfaces 1526, inner surfaces 1528, and end surfaces 1530.

The inner surfaces 1528 can face the inner cavity 1524 and directly contact and boarder the inner cavity 1524. The outer surfaces 1526 can be parallel to the inner surfaces 1528.

As is depicted, the outer surfaces 1526 of the raised perimeter 1522 can be extended and parallel to either along the axis running between the top side surface 1510 to the bottom side surface 1512 and along the axis running between the right side surface 1506 and the left side surface 1508. The end surfaces 1530 can be positioned perpendicular to the outer surfaces 1526 and the inner surfaces 1528 and can be parallel to the inner cavity 1524.

The inner cavity 1524 and the end surfaces 1530 can be offset by the width of the inner surfaces 1528 while the end surfaces 1530 can extend beyond the back side surface 1504 by the width of the outer surfaces 1526. The end surfaces 1530, the back side surface 1504, and the inner cavity 1524 are depicted as parallel.

The inner cavity 1524 is shown having a surface texture 1532. The surface texture 1532 is contemplated to include texture extended below the surface of the inner cavity 1524 such as an etched texture. The surface texture 1532 is further contemplated to include texture extended above the surface of the inner cavity 1524 such as a raised molded texture. Further, the surface texture 1532 can be embedded under a smooth inner cavity 1524 or printed thereon.

As can be seen the surface texture 1532 of the inner cavity 1524 is depicted as letters. It is contemplated that the surface texture 1532 can be any combination of letters, numbers, characters, or symbols.

The outer surfaces 1526 of each of the surface protrusions 1502 is shown connected to adjacent surface protrusions 1502 with an inner connect 1534. The inner connect 1534 can include the outer surfaces 1526 and the end surfaces 1530 similar to the surface protrusions 1502. The end surfaces 1530 of the surface protrusions 1502 and the inner connect 1534 can be coplanar and parallel.

As is shown when larger surface protrusions 1502 span two or more smaller surface protrusions 1502, the larger surface protrusions 1502 can be connected to both of the smaller surface protrusions 1502 on a single side with multiple inner connect 1534.

Alternatively, it is shown, that one outer surfaces 1526 from one surface protrusions 1502 can be connected to one outer surfaces 1526 of another surface protrusions 1502 with a single or with multiple inner connect 1534.

The inner connect 1534 can be extended and connect perpendicularly between outer surfaces 1526 of the surface protrusions 1502. Near the top side surface 1510 and extended from the back side surface 1504, the protection system 1500 is shown having a sensor extension 1536.

The sensor extension 1536 can extend out away from the back side surface 1504 and terminate with the end surfaces 1530 coplanar and parallel to the end surfaces 1530 of the surface protrusions 1502. The inner surfaces 1528 of the sensor extension 1536 can boarder and directly contact the electronic device 1520 allowing sensors 1538 to be exposed from the protection system 1500.

The sensors 1538 exposed from within the sensor extension 1536 can include image sensors, sound sensors, and even other components such as flash lighting. It has been discovered that the inner surfaces 1528 of the sensor extension 1536 extended out away from the back side surface 1504 can provide environmental protection for the sensors 1538 like shading from sun and even impact protection.

Figure 16:
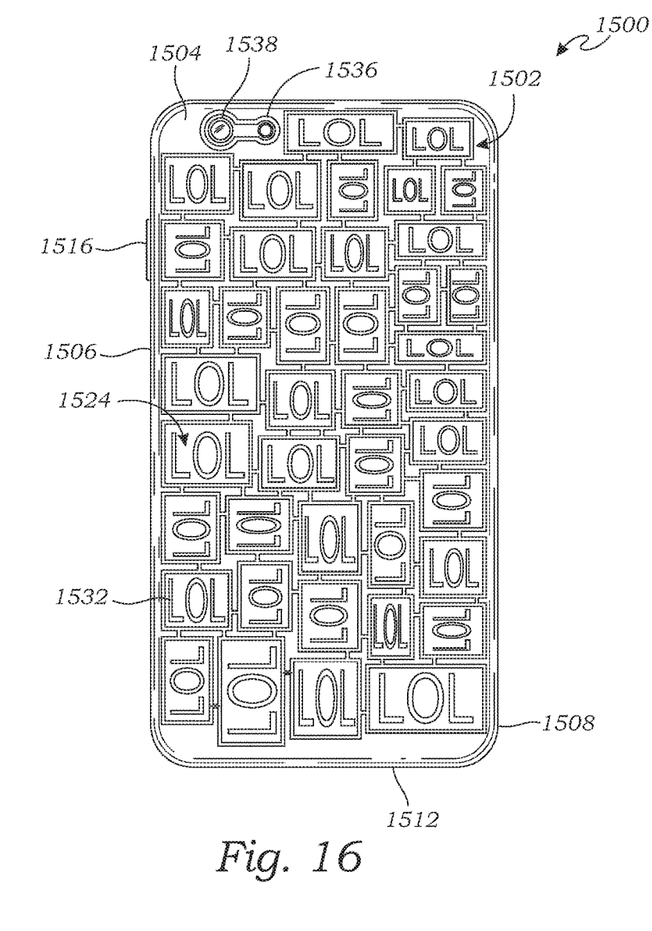
FIG. 16 is a back side view of the protection system of FIG. 15.

Referring now to FIG. 16, therein is shown a back side view of the protection system 1500 of FIG. 15. The protection system is depicted having the function keys 1516 extended from the right side surface 1506.

The sensors 1538 are also shown exposed from the back side surface 1504 and surrounded by the sensor extension 1536. The surface protrusions 1502 are depicted substantially filling the back side surface 1504 with a layout that follows the contours of the back side surface 1504.

The surface texture 1532 within the inner cavity 1524 can be in any direction or orientation. The size of the surface texture 1532 is dictated by the size and shape of the inner cavity 1524.

Figure 17:
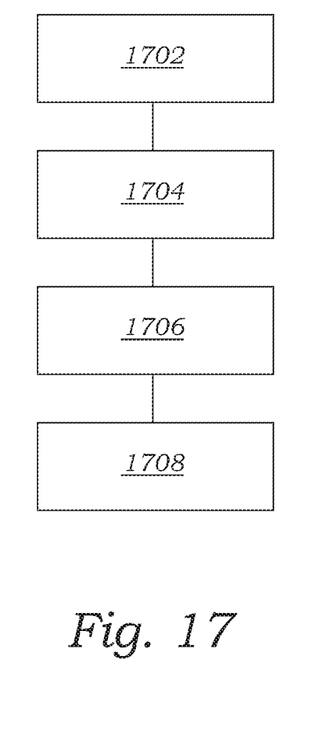
FIG. 17 is a flow chart for a method of manufacturing the protection system.

Referring now to FIG. 17, therein is shown a flow chart for a method of manufacturing the protection system. The method can include: forming a back side surface, a right side surface, a left side surface, a top side surface, a bottom side surface, and a front side surface, the front side surface configured to wrap around onto a front side display of an electronic device, and the back side surface configured to conform to the electronic device in a block 1702; forming a first surface protrusion having a first outer perimeter, the first surface protrusion located on the back side surface in a block 1704; forming a second surface protrusion having a second outer perimeter, the second outer perimeter larger than the first outer perimeter in a block 1706; and forming a connection cutout within the top side surface or the right side surface in a block 1708.

Thus, it has been discovered that the protection system furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

While the protection system has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:

1. An electronic device protection system comprising:
    a back side surface, a right side surface, a left side surface, a top side surface, a bottom side surface, and a front side surface, the front side surface configured to wrap around onto a front side display of an electronic device, the top side surface, the right side surface, the left side surface, and the bottom side surface angled and extended away from the back side surface, and the back side surface:
        configured to conform to the electronic device,
        configured to mount to the electronic device and face in a direction opposite of a display of the electronic device,
        bounded along a perimeter by the top side surface, the right side surface, the left side surface, and the bottom side surface, and
        having a uniform curvature;
    a first surface protrusion having a first outer perimeter, the first surface protrusion located on the back side surface, the first surface protrusion having an inner cavity formed within the first surface protrusion, the first surface protrusion including an inner surface surrounding the inner cavity, the inner surface extending away from the back side surface, the inner surface perpendicular to the inner cavity, and the entire first outer perimeter in direct contact with the back side surface;
    a second surface protrusion having a second outer perimeter, the second outer perimeter larger than the first outer perimeter; and
    a connection cutout formed within the top side surface or the right side surface.

2. The system of claim 1 further comprising a symbol or letters on the first surface protrusion and the second surface protrusion.

3. The system of claim 1 further comprising an inner connect in direct contact with the first outer perimeter of the first surface protrusion and the second outer perimeter of the second surface protrusion, and the inner connect terminates with a surface coplanar to upper most surfaces of the first outer perimeter and the second outer perimeter.

4. The system of claim 1 further comprising a surface texture on the first surface protrusion and the second surface protrusion.

5. An electronic device protection system comprising:
    a back side surface, a right side surface, a left side surface, a top side surface, a bottom side surface, and a front side surface, the front side surface configured to wrap around onto a front side display of an electronic device, the top side surface, the right side surface, the left side surface, and the bottom side surface angled and extended away from the back side surface, and the back side surface:
        configured to conform to the electronic device,
        configured to mount to the electronic device and face in a direction opposite of a display of the electronic device,
        bounded along a perimeter by the top side surface, the right side surface, the left side surface, and the bottom side surface, and
        having a uniform curvature;
    a first surface protrusion having a first outer perimeter, the first surface protrusion located on the back side surface, the first surface protrusion having an inner cavity formed within the first surface protrusion, the first surface protrusion including an inner surface surrounding the inner cavity, the inner surface extending away from the back side surface, the inner surface perpendicular to the inner cavity, and the entire first outer perimeter in direct contact with the back side surface;

a second surface protrusion having a second outer perimeter, the second outer perimeter larger than the first outer perimeter;

a sensor extension extended out from the back side surface; and a connection cutout formed within the top side surface or the right side surface.

6. The system of claim 5 wherein the sensor extension terminates with a surface coplanar to upper most surfaces of the first outer perimeter and the second outer perimeter.

7. The system of claim 5 further comprising a third surface protrusion formed on the right side surface or the left side surface.

8. The system of claim 5 wherein the first surface protrusion and the second surface protrusion are extended out different distances from the back side surface.

9. The system of claim 5 wherein the first surface protrusion and the second surface protrusion are extended out the same distance from the back side surface.

10. A method of manufacturing an electronic device protection system comprising:

forming a back side surface, a right side surface, a left side surface, a top side surface, a bottom side surface, and a front side surface, the front side surface configured to wrap around onto a front side display of an electronic device, the top side surface, the right side surface, the left side surface, and the bottom side surface angled and extended away from the back side surface, and the back side surface:
configured to conform to the electronic device,
configured to mount to the electronic device and face in a direction opposite of a display of the electronic device,
bounded along a perimeter by the top side surface, the right side surface, the left side surface, and the bottom side surface, and
having a uniform curvature;

forming a first surface protrusion having a first outer perimeter, the first surface protrusion located on the back side surface, the first surface protrusion having an inner cavity formed within the first surface protrusion, the first surface protrusion including an inner surface surrounding the inner cavity, the inner surface extending away from the back side surface, the inner surface perpendicular to the inner cavity, and the entire first outer perimeter in direct contact with the back side surface;

forming a second surface protrusion having a second outer perimeter, the second outer perimeter larger than the first outer perimeter; and forming a connection cutout within the top side surface or the right side surface.

11. The method of claim 10 further comprising creating a symbol or letters on the first surface protrusion and the second surface protrusion.

12. The method of claim 10 further comprising forming an inner connect in direct contact with the first outer perimeter of the first surface protrusion and the second outer perimeter of the second surface protrusion, and the inner connect terminates with a surface coplanar to upper most surfaces of the first outer perimeter and the second outer perimeter.

13. The method of claim 10 further comprising forming a surface texture on the first surface protrusion and the second surface protrusion.

14. The method of claim 10 further comprising forming a sensor extension extended out from the back side surface.

15. The method of claim 14 wherein forming the sensor extension includes forming the sensor terminating with a surface coplanar to upper most surfaces of the first outer perimeter and the second outer perimeter.

16. The method of claim 14 further comprising forming a third surface protrusion on the right side surface or the left side surface.

17. The method of claim 14 wherein forming the first surface protrusion and forming the second surface protrusion includes forming the first surface protrusion and forming the second surface protrusion extending out different distances from the back side surface.

18. The method of claim 14 wherein forming the first surface protrusion and forming the second surface protrusion includes forming the first surface protrusion and forming the second surface protrusion extending out the same distance from the back side surface.

* * * * *